No. 797,289. PATENTED AUG. 15, 1905.
S. V. KENNEDY & C. S. SHARP.
DISK HARROW OR CULTIVATOR.
APPLICATION FILED MAR. 21, 1904.
3 SHEETS—SHEET 2.
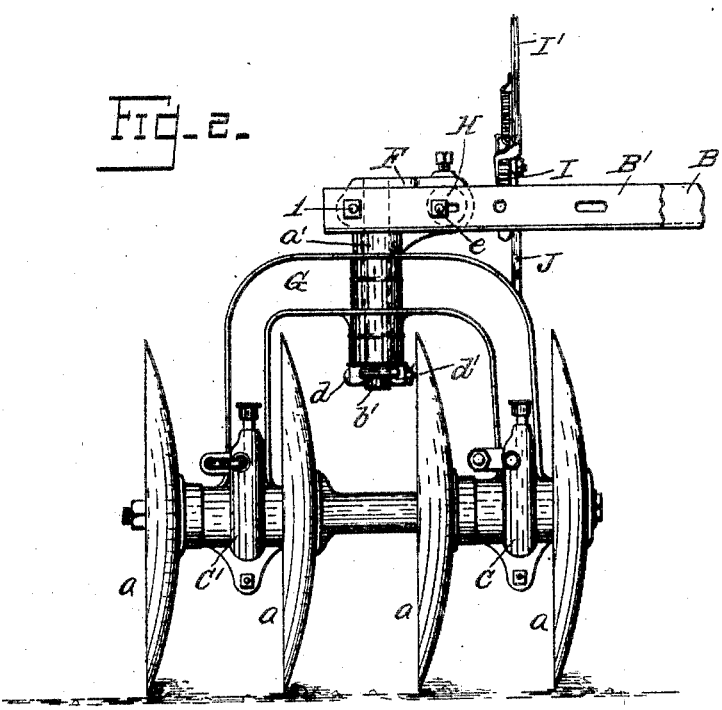
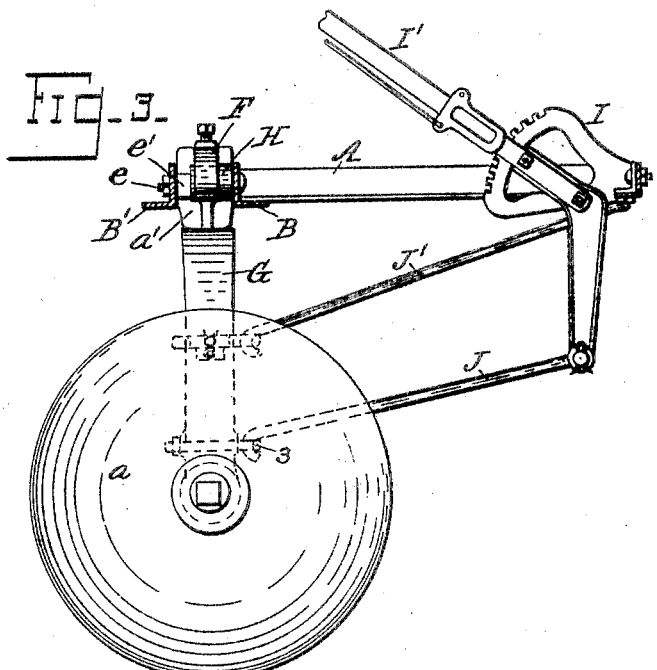
Witnesses.
Fredic Christine Moore
Howard R. Hawkins
Inventors
Samuel V. Kennedy
Charles S. Sharp
by W. C. Jordinston
their Attorney.

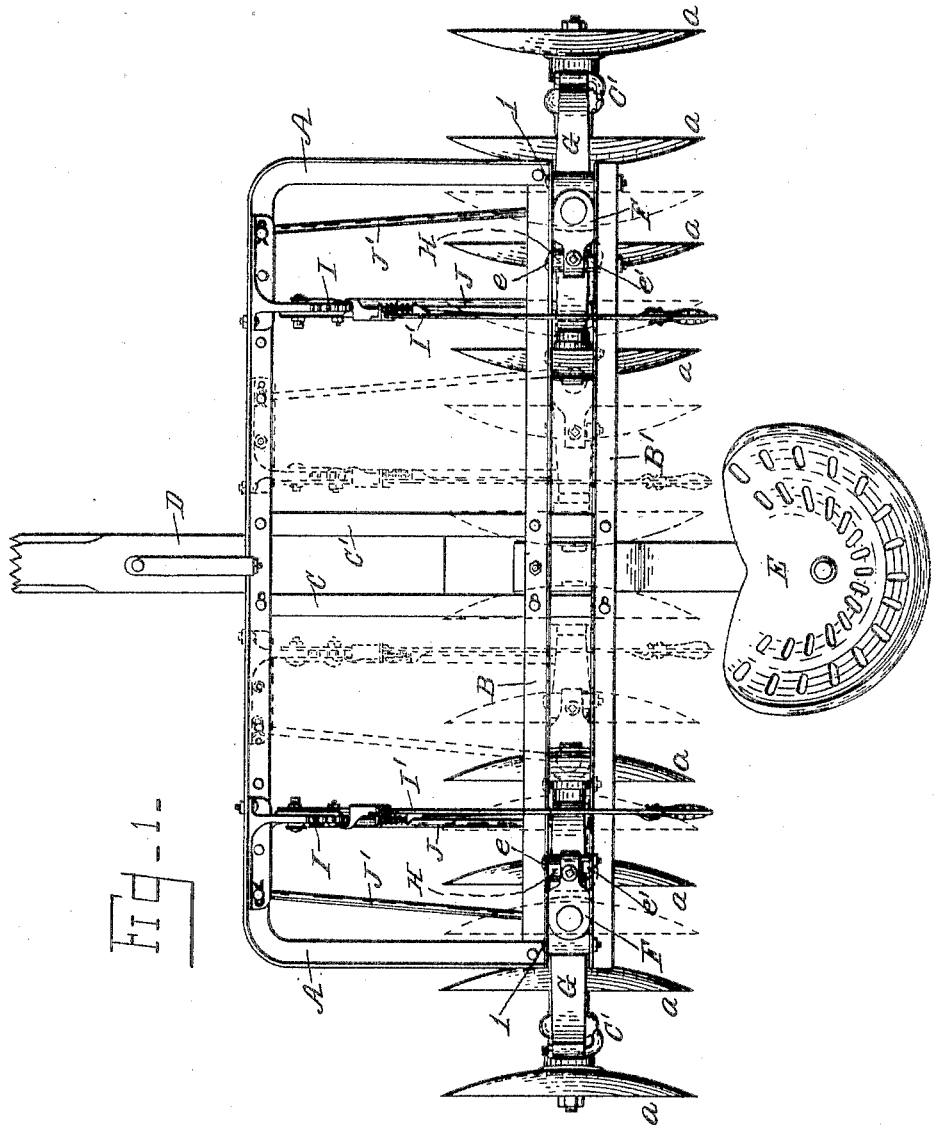

No. 797,289. PATENTED AUG. 15, 1905.
S. V. KENNEDY & C. S. SHARP.
DISK HARROW OR CULTIVATOR.
APPLICATION FILED MAR. 21, 1904.
3 SHEETS—SHEET 3.
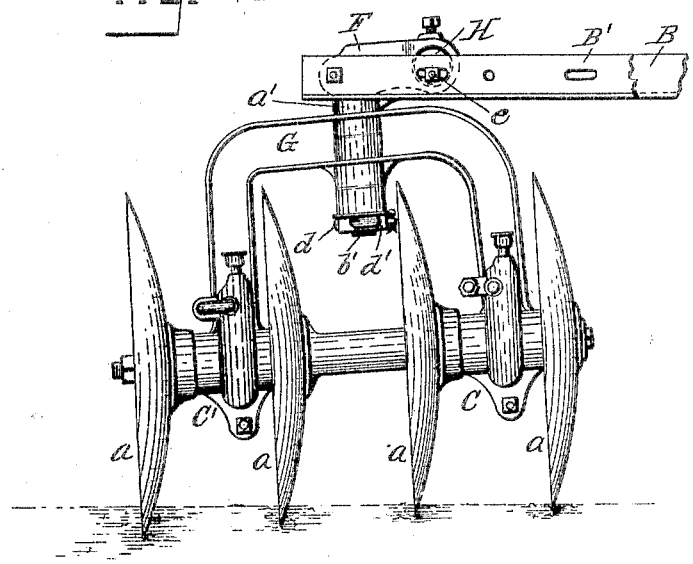
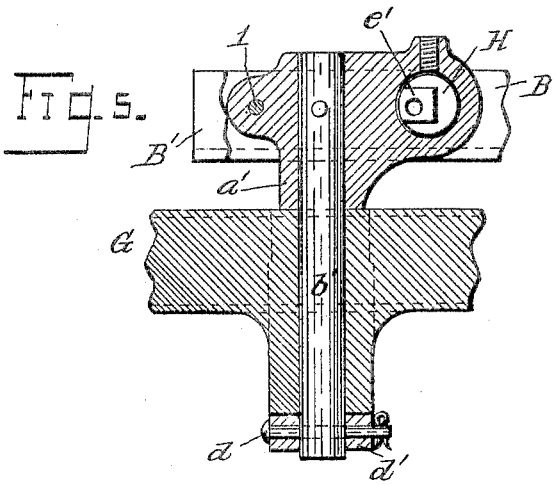
Witnesses
Fredk Houston Moore
Norvald R. Hawkins
Inventors
Samuel V. Kennedy
Charles S. Sharp
by W. C. Johnston
their Attorney

UNITED STATES PATENT OFFICE.

SAMUEL V. KENNEDY AND CHARLES S. SHARP, OF AUBURN, NEW YORK, ASSIGNORS, BY MESNE ASSIGNMENTS, TO INTERNATIONAL HARVESTER COMPANY, A CORPORATION OF NEW JERSEY.

DISK HARROW OR CULTIVATOR.

No. 797,289.     Specification of Letters Patent.     Patented Aug. 15, 1905.

Application filed March 21, 1904. Serial No. 199,206.

*To all whom it may concern:*

Be it known that we, SAMUEL V. KENNEDY and CHARLES S. SHARP, citizens of the United States, residing at Auburn, county of Cayuga, and State of New York, have invented certain new and useful Improvements in Disk Harrows or Cultivators, of which the following is a specification.

Our invention relates to that class of implements known as "disk harrows or cultivators," and has for its object the construction of an implement that can be used in vineyards or with growing crops ordinarily planted in rows.

In the drawings, Figure 1 is a plan view. Fig. 2 is an enlarged rear view of one of the gangs of disks attached to the gang-frame. Fig. 3 is an end view of Fig. 2. Fig. 4 is a similar view to Fig. 2, showing the gang tilted; and Fig. 5 is an enlarged detail section of the tilting device.

The main frame A is made, preferably, of angle-steel bent to a rectangular form. The rear of the frame is constructed of two lengths of steel bar B B', also angular in shape, and is rigidly bolted to the sides of the main frame. Braces C C' extend from the front of the main frame to the bars B B', to which they are bolted, giving rigidity to the structure and forming a place of attachment for the pole D and driver's seat E. The disk gangs are composed of a series of disks $a$ on axles $b$, journaled in bearings on the yokes G. The center disks are spaced by spools in the usual manner and the outer disks by the bearings C C'.

As it is intended that our harrow shall be so constructed as to be adjustable to varying conditions, so that the soil may be thrown in toward the center of the harrow or away from it and that the disk gangs may be tilted laterally, so that the outer disks will work deeper than the disks on the inner ends of the gangs or the contrary, as desired, and that the gangs may be adjusted to the center of the harrow for the purpose of forming a harrow capable of general work we have devised certain means of accomplishing these results, as will be now explained.

F represents castings pivoted at $l$ between the bars B B' and the outer end thereof. In the verticel arms $a'$ of the castings F are rigidly secured shafts $b'$, upon which the yokes G, carrying the disks $a$, are revolubly mounted. Bolts $d$ pass through washers $d'$ and the shafts $b'$, retaining the yokes G upon the shafts. Bolts $e$, passing through the bars B B', act as shafts upon which revolve the eccentrics H, turning in the horizontal arms of the castings F. On the rear of each eccentric and at their pivotal points are square projections $e'$, integral with the eccentrics, so that by loosening the bolts $e$ and applying an ordinary wrench to the projections $e'$ the eccentrics can be revolved, rocking the castings F and tilting the disk gangs, as may be desired. Then tightening the bolts $e$ will hold the gangs in their tilted position.

Secured to the front of the main frame A are toothed quadrants I, on which are pivoted hand-levers I', having detents of well-known construction to engage with the toothed quadrant I. Draft-rods J are connected to the disk gangs, as at 3, and to the lower ends of the hand-levers I', so that the disk gangs can be operated at different angles. Brace-rods J', the forward ends engaging with the front of the main frame A and the rear ends hooked in eyes integral with the washers $d'$, add rigidity to the structure.

As shown in the drawings, the harrow is adjusted for the cultivation of crops planted in rows. It is often desirable, however, to use the harrow with the disk gangs close together, as shown in dotted lines in Fig. 1. To that end holes properly spaced have been provided in the bars B B' and the front of the main frame, so that the disk gangs, the brace-rods J', the quadrants I, the hand-levers I', and the draft-rods J can be moved toward the center of the harrow, always being in a line substantially parallel with the line of draft and having the same relative position as when located at the ends of the frame, as shown, and substantially parallel with the line of draft whether adjusted toward the center of the harrow-frame or toward the ends of the frame. The gangs are also reversible, the same means for attaching the brace and draft rods being provided on both sides of the gangs.

Having thus described our invention, what we claim, and desire to secure by Letters Patent, is—

1. In a disk harrow or cultivator, a main frame, disk gangs laterally adjustable thereon, brace-rods attached to the pivotal points of the gangs and the main frame, quadrants on the main frame, levers on said quadrants, draft-rods connecting said levers with the disk gangs, said brace-rods, quadrants, levers and draft-rods laterally adjustable with the gangs.

2. In a disk harrow or cultivator, a main frame, disk gangs laterally adjustable thereon, brace-rods attached to the pivotal points of the gangs and the main frame, quadrants on the main frame, levers on said quadrants, draft-rods connecting said levers with the disk gangs, said brace-rods, quadrants, levers and draft-rods laterally adjustable with the gangs, and substantially parallel with the line of draft.

In testimony whereof we hereunto set our hands, this 17th day of March, 1904, in the presence of two attesting witnesses.

SAMUEL V. KENNEDY.
CHARLES S. SHARP.

Witnesses:
 ELMER W. STUPP,
 F. L. ATHERLY.